Feb. 15, 1966  J. L. SMITH  3,234,652
PERSPECTIVE VIEWER
Filed June 8, 1962  2 Sheets-Sheet 2
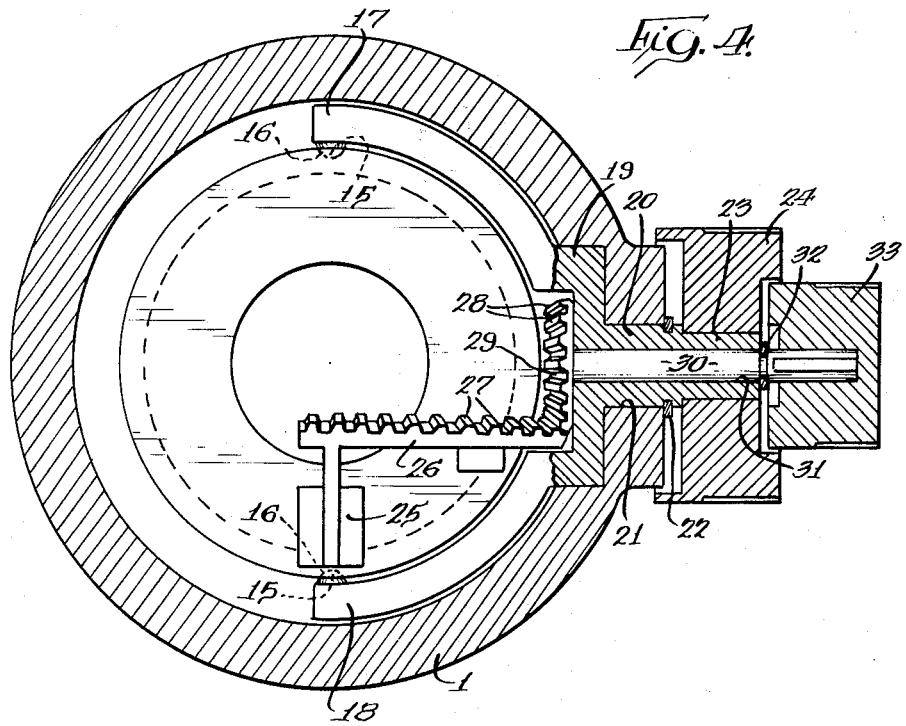
Fig. 4.
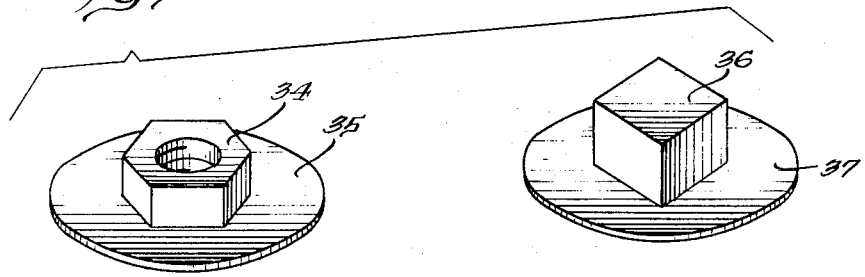
Fig. 5.
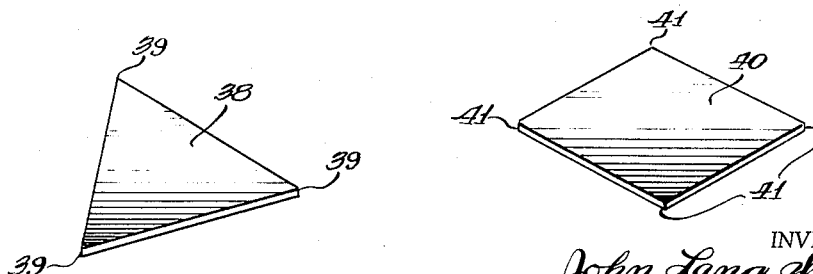
INVENTOR:
John Lang Smith
BY
Gary, Desmond & Parker,
Attys

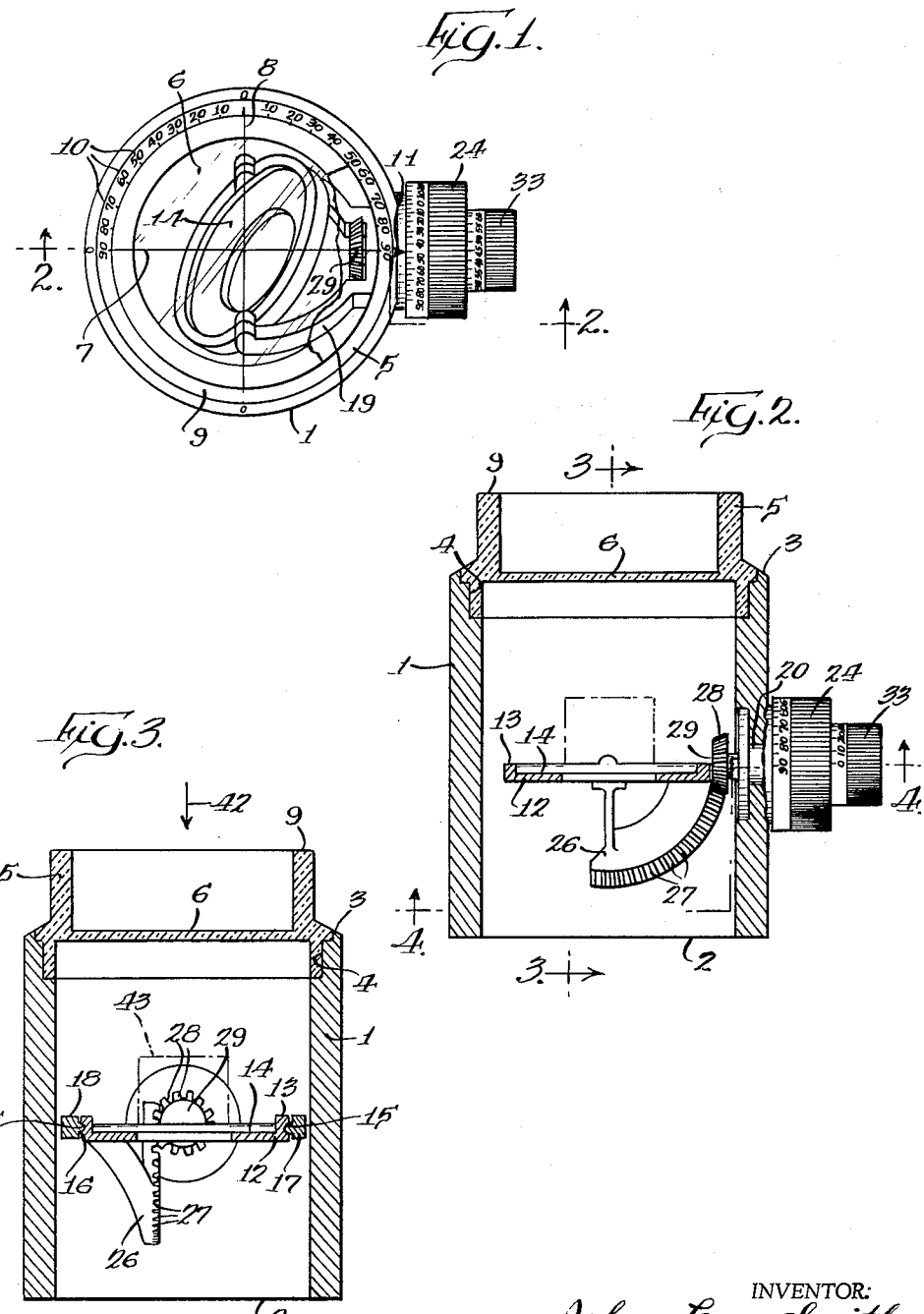

United States Patent Office 3,234,652
Patented Feb. 15, 1966

3,234,652
PERSPECTIVE VIEWER
John Lang Smith, 836 W. Huntington Drive,
Arcadia, Calif.
Filed June 8, 1962, Ser. No. 201,031
3 Claims. (Cl. 33—64)

This invention relates to the art of viewing devices of a type for viewing an object in perspective as an aid to draftsmen and artists.

When drawing an object in perspective while viewing it, it is ordinarily necessary for the draftsman to guess at the proper perspective shape with a minimum benefit from mechanical aids, and the accuracy of the drawing depends substantially upon the drawing ability of the draftsman. In some cases, depending upon the simplicity and symmetry of the object, it is possible to approximate a shape by known drawing techniques with the aid of compasses and the like, but the resulting drawing is not usually an accurate portrayal because it is still only an approximation.

It is the principal object of this invention to provide an improved viewing device for viewing objects in perspective so that they can be translated into accurate drawing portrayals of the objects.

It is another object of the invention to provide an improved viewing device for viewing an object in perspective which has means for adjusting the angular position of the object relative to the line of viewing so that the object can be viewed and drawn at any desired perspective angle.

It is another object of the invention to provide such an improved viewing device for viewing an object in perspective whereby the device is provided with a visual indicator which establishes a reference plane for the angular position of the object being viewed and which has reference axes indications thereon which can be rotated to vary their alignment with the object being viewed.

It is still another object of the invention to provide such an improved viewing device having an object support mounted to be tiltable on two different axes so that the object being viewed can be supported at any desired angle relative to the line of viewing through the viewer.

It is another object of the invention to provide such an improved viewing device having an object support mounted to be tiltable on two different axes which is accomplished by employing a gimbal mechanism.

It is another object to provide such an improved viewing device having a tiltable object support which has a vernier on the means for causing tilting of the support so that the angle of tilting can be readily ascertained.

It is another object to provide such an improved viewing device having an object support mounted to be tiltable on two different axes whereby the tilting on at least one of said axes is effectuated by the use of a gear rack and pinion mechanism where the pinion is on a drive shaft mounted concentrically with a shaft which provides the tilting on the other axis.

Other objects and advantages of the invention should become apparent upon reference to the accompanying drawings in which:

FIG. 1 shows a top plan view of a viewing device embodying this invention and shows the view in the ordinary line of sight of the device when viewing an object in perspective;

FIG. 2 shows a sectional view along the line 2—2 of FIG. 1;

FIG. 3 shows a sectional view along the line 3—3 of FIG. 2;

FIG. 4 shows an enlarged sectional view along the line 4—4 of FIG. 2; and

FIG. 5 shows four different examples of objects which can be viewed and drawn in accurate perspective by the use of the viewing device.

The preferred embodiment of the invention shown in the drawings is provided with a viewing frame 1 which is in the form of a hollow cylindrical tube having an open bottom end 2 adapted to be rested upon a table or other support. The upper end 3 is provided with an annular recess 4 in which is fit a cylindrical visual indicator 5 which is free to rotate in the annular recess 4. The visual indicator 5 is provided with a transparent viewing screen 6 marked or inscribed with two cross hairs 7 and 8 thereon at right angles to each other to act as axes indications for the object to be viewed. The upper rim 9 is preferably provided with angle markings 10 to indicate the angular orientation of the cross hairs 7 and 8 relative to a reference arrow or mark 11.

Intermediate its upper and lower ends 2 and 3 and within the viewing frame 1 is an object support 12 in the form of an annular disc having an annular upstanding flange 13 at its outer peripheral edge. The annular flange 13 defines a central recess 14 into which an object to be viewed can be positioned.

The object support 12 is provided with two diametrically opposite dimples 15 which engage projections 16 to journal the support 12 on a first axis to the two tines 17 and 18 of a gimbal fork 19. The gimbal fork 19 has a shaft portion 20 journalled in an opening 21 through the wall of the viewing frame 1. A retainer ring 22 is provided to retain the shaft portion 20 longitudinally fixed. The outer end 23 of the shaft portion 20 is keyed or otherwise secured to a thumb knob 24 which is knurled and marked with angle indications around its periphery to indicate the angle of rotation of the gimbal fork 19 relative to the reference arrow or mark 11.

Secured to the object support 12 at 25 is a quarter gear segment or curved rack 26 having bevel gear teeth 27 engaging the bevel gear teeth 28 of a pinion gear 29. The pinion gear 29 is provided with a shaft 30 which is journalled in a bore 31 extending concentrically through the shaft portion 20. The shaft 30 is held in place longitudinally by a retaining ring 32 and its outer end is keyed or otherwise secured to a thumb knob 33. It is knurled and marked with angle indications around its periphery to indicate the angle of rotation of the object support 12 on the axis of the projections 16 of the gimbal fork 19 relative to the reference arrow or mark 11.

In this way the angular positions of the object support 12 on two different axes of rotation are indicated simultaneously.

As shown in FIG. 5, there are four examples of objects which can be viewed in perspective on the improved viewing device. The first object 34 is a hexagonal nut secured to a mounting plate 35. The mounting plate 35 is of a diameter equal to that of the central recess 14 of the object support 12. This permits the mounting plate 35 to be rested in the recess 14 so that it can be viewed through the viewing screen 6.

Another cubical shaped object 36 is mounted on another mounting plate 37 and is adapted to be applied to the viewing device and viewed in the same manner as the nut 34 and its mounting plate 35.

A triangular shaped object 38 can also be viewed conveniently. It has dimensions so that the three corners 39 of the object fit against the inside circumference of the annular flange 13 defining the recess 14. Likewise, a square shaped object 40 can also be positioned on the object support in a manner similar to the triangular shaped piece 38, except that its four corners 41 are dimensioned to fit snugly against the annular flange 13. Many other shapes of objects are possible to be viewed with the viewing device and they can be mounted in other convenient ways. For example, they can be provided with temporary adhesive or tape to secure the objects to the object support.

In use, one of the objects is positioned upon the object support 12 so that it can be viewed through the viewing screen 6 longitudinally through the device in the direction of the arrow 42 (FIG. 3). In both FIGS. 2 and 3, an object 43 s indicated by phantom outline in its viewing position. After positioning, the visual indicator 5 is rotated on the viewing frame so that the cross hairs 7 and 8 are oriented to a selected position of alignment with the object to establish reference axes. The two thumb knobs 24 and 33 are then rotated to a particular angle to thereby orient the object on its two axes of support. With this done, the draftsman can then scale off dimensions along the cross hairs 7 and 8 and record them on his drawing. He can then rotate the cross hairs 7 and 8 to a new angular position and scale off new dimensions on his drawing corresponding to the new angle of orientation of the cross hairs. In this manner, by scaling the dimensions of the object as viewed along a multiple number of axes positions indicated by the cross hairs 7 and 8, an accurate representation of the object being viewed can be reproduced in a drawing as it actually looks in perspective.

For extra convenience, the cross hairs 7 and 8 can be graduated into designated unit lengths so that no actual scaling of the cross hairs 7 and 8 is required beyond what is visually apparent as a reading in units.

Although only a single embodiment of the invention has been shown and described, it should be understood that the invention can be made in many different ways without departing from the true scope of the invention as defined by the appended claims.

I claim:
1. A device for viewing an object in perspective comprising a frame having a viewing axis, an object support in said frame intersecting said axis, a gimbal fork journalled on said frame on an axis perpendicular to said viewing axis, a first graduated knob on said fork to the exterior of said frame for rotating said fork about its axis, said support being pivotally mounted on said fork on an axis perpendicular to the axis of rotation of said fork, a gear rack secured to said support, a pinion journalled on the axis of said fork and meshed with said rack, a second graduated knob to the exterior of said frame coaxial with and immediately adjacent said first knob for rotating said pinion, said frame being tubular and said viewing axis comprising the axis of the tube, a visual indicator removably and rotatably mounted in one end of said tube and including a viewing screen perpendicular to said viewing axis, axes indications on said viewing screen and a scale for indicating the angular position of said axes indications relative to said frame.

2. A device for viewing an object in perspective comprising an upright tubular frame the axis of which comprises a viewing axis, a view screen journalled in the upper end of said frame and bearing axes indications, a tubular shaft journalled in one wall of said frame below said view screen on an axis perpendicular to said viewing axis, a second shaft coaxial with and extending through said tubular shaft, a gimbal fork on said tubular shaft within said frame pivotally mounted on said gimbal fork on an axis perpendicular to the axis of said tubular shaft, an arcuate rack on said support mounted so that one end thereof is adjacent said second shaft when said support is generally parallel to the axis of said shaft and the other end thereof is adjacent said second shaft when said support is generally perpendicular to the axis of said shaft, a pinion on said second shaft meshed with said rack, a knob on said tubular shaft immediately to the exterior of said frame for rotating said gimbal fork about the axis of said shaft, and a knob on said second shaft immediately to the exterior of the knob on said tubular shaft for rotating said pinion and thus pivoting said support on said gimbal fork from a position generally parallel to the gimbal fork to a position generally at right angles to the gimbal fork.

3. A device for viewing an object in perspective consisting essentially of an upright tubular frame the axis of which comprises a viewing axis, a visual indicator journalled in the upper end of said frame for rotation about said viewing axis and bearing a graduated scale for indicating its position relative to said frame, said indicator including a view screen coaxial with and perpendicular to said viewing axis and bearing a pair of hairlines disposed at right angles to one another, a tubular shaft journalled in one wall of said frame on an axis perpendicular to said viewing axis, a second shaft coaxial with and extending through said tubular shaft, a gimbal fork on said tubular shaft within said frame, an object support within said frame pivotally mounted on said gimbal fork on an axis perpendicular to and intersecting the axis of said shafts, a quarter gear segment depending from said support and mounted so that one end thereof is adjacent said second shaft when said support is coplanar with the axis of said shaft and the other end thereof is adjacent said second shaft when said support is perpendicular to the axis of said shaft, a pinion on said second shaft disposed within said gimbal fork and meshed with said gear segment for pivoting said support on said gimbal fork from a position coplanar with the gimbal fork to a position at right angles to the gimbal fork, a graduated knob on said tubular shaft immediately to the exterior of said frame for rotating said gimbal fork about the axis of said shaft and for indicating the position of said fork relative to said frame, and a graduated knob on said second shaft immediately to the exterior of the knob on said tubular shaft for rotating said pinion and for indicating the position of said support relative to said frame.

References Cited by the Examiner

UNITED STATES PATENTS

| 1,891,052 | 12/1932 | Ott | 88—39 |
| 1,916,609 | 7/1933 | Emmons | 88—39 |
| 2,350,068 | 5/1944 | Scheller | 33—64 X |

FOREIGN PATENTS

| 23,273 | 10/1909 | Great Britain. |

ISAAC LISANN, *Primary Examiner.*